S. E. TOMPKINS.

Harness-Saddle Trees.

No. 6,013. Reissued Aug. 11, 1874.

WITNESSES:

K. Newell

James H. Hunter

INVENTOR:

Sam'l E. Tompkins

UNITED STATES PATENT OFFICE.

SAMUEL E. TOMPKINS, OF SING SING, NEW YORK.

IMPROVEMENT IN HARNESS-SADDLE TREES.

Specification forming part of Letters Patent No. 45,880, dated January 10, 1865; reissue No. 6,013, dated August 11, 1874; application filed December 3, 1873.

*To all whom it may concern:*

Be it known that I, SAMUEL E. TOMPKINS, now of Sing Sing, in the State of New York, late of Newark, in the State of New Jersey, have invented certain new and useful Improvements in Harness or Gig Saddle Trees; and I do hereby declare that the following is a full, clear, and exact description of the same, reference being had to the accompanying drawings forming part of this specification.

This invention relates to improvements in that class of harness or gig saddle trees which are composed of iron, including the jockeys. These improvements consist, first, in constructing the bearings of concave form on their inner sides, and of convex form on their under sides; second, of connecting together said bearings by means of a thin strip or plate; third, in casting the seat separate from the iron or metal jockeys, and in casting the seat and cantle portion thereof in separate pieces. The object of the first of these improvements is to avoid all projections at the under side of the bearings, such as nuts and the ends of the terret-screws, which have a tendency to chafe or gall the back of the horse. That of the second is to afford a support between the bearings for the leather flaps; that of the third to obtain a seat superior in form and style, and which is lighter and easier to mold and cast.

Figure 1:
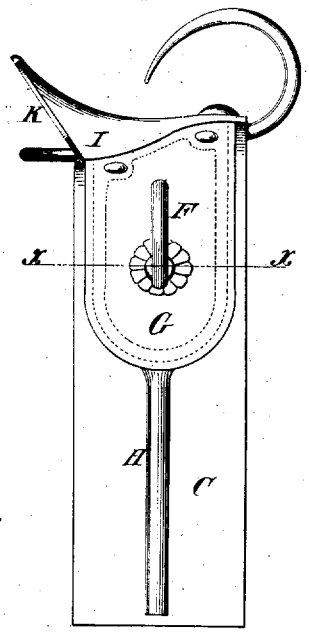
Figure 5:
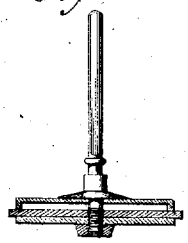
Figure 4:
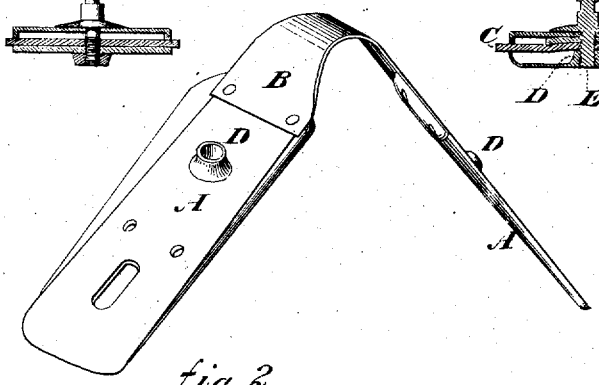
Figure 3:
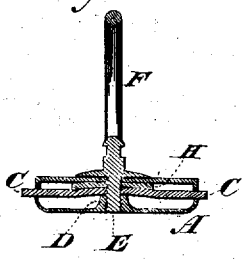
Figure 2:
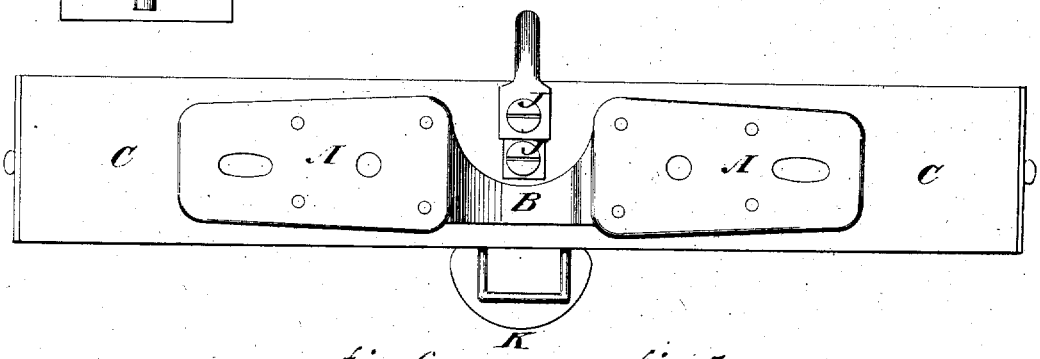
Figure 6:
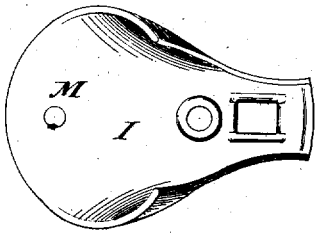
Figure 7:
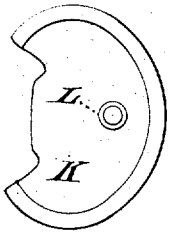

In the drawings, Figure 1 is a side view of a harness-saddle tree constructed according to my improvements. Fig. 2 is a view of the underneath part of the same, showing the two bearings. Fig. 3 is a transverse section of the tree, taken in the line *x x* of Fig. 1. Fig. 4 is a detached view of the bearings in perspective. Fig. 5 is a view of the old form of bearings and connection of the terret-screw therewith in cross-section, showing the state of the art in this respect at the time of making my invention. Figs. 6 and 7 are views of the seat and cantle detached from the iron jockeys.

A A are the two bearings of the tree, which may be cast or swaged or struck up out of wrought-metal or rolled-metal plates. Their under surfaces are rounded or made convex, so as to conform to the back of the horse, and the inner sides of the bearings are concave to accord with the convexity of the under surfaces. These two bearings may be connected together, if desired, by a thin strip or plate of metal, as seen at B, which is curved in semicircular or form approximating thereto, thus giving a better support to the leather flaps C C. The inner concave surfaces of the bearings A A are provided with projections D, which contain internal screw-threads to serve as nuts to receive the screw E of the terrets F. The concave form of the inner sides of the bearings admit of these nuts being on such inner sides without having them interfere with the flaps or back-band, as the upper edges of the nuts need not be made so as to project beyond the level of the edges of the bearings, the flaps and back-band being pressed to a certain extent downward within these bearings, as the screw of the terret is turned down into the projections D. G are the jockeys, which are of cast-iron, and are fitted or placed one over each of the leather flaps C C, the screws E E of the terrets passing through the jockeys. H is the back-band, the ends of which are inserted between the jockeys and the flaps, the terret-screws passing through them.

By this arrangement it will be seen that the bearings A A and jockeys G serve as clamps under the screws of the terrets, and firmly hold the flaps and back-band in position, and at the same time, owing to the concave form of the inner surfaces of the bearings, these parts are made to assume a snug position relatively with each other, so as to give a chaste and neat appearance to the saddle; while the inside terret-nuts—the most important feature of all—avoid any projections whatever at the under side of the tree, and hence the back of the horse cannot be injured or galled, as is the case to a greater or less extent with the ordinary saddles of this class.

I is the seat, which is also of iron, and cast separate from the jockeys and secured to the latter by screws J. K is the cantle part of the seat, being cast in a separate piece, on the interior of which is cast a pin, L. This engages in a small hole, M, drilled or punched in the seat on the under surface, so as to enable the parts to sustain each other when placed together.

This seat and cantle part so constructed has a raised and finished form for the metal jockeys, and is lighter, and molds and casts easier.

I claim—

1. The bearings constructed of concave form on their inner sides, and of convex form on their under sides, substantially as described.

2. The bearings in combination with a metal strip or plate, such strip arranged substantially as described.

3. The bearings in combination with iron jockeys, such bearings constructed substantially as described.

4. An iron seat, cast separately, in combination with iron jockeys, substantially as described.

5. An iron seat, cast separately, in combination with iron jockeys and the bearings, substantially as described.

6. An iron seat, cast separately, in combination with the cantle part and with the iron jockeys, substantially as described.

7. An iron seat, cast separately, in combination with the cantle part, and with the iron jockeys and the bearings, substantially as described.

8. An iron seat cast separate from the cantle part, the two being united by a pin, substantially as described.

SAML. E. TOMPKINS.

Witnesses:
K. NEWELL,
SAML. TRO. SMITH.